United States Patent [19]

Jones

[11] 4,210,234
[45] Jul. 1, 1980

[54] TORSIONAL VIBRATION DAMPER

[75] Inventor: Milford F. Jones, Kettering, Ohio

[73] Assignee: General Motors Corporation, Detroit, Mich.

[21] Appl. No.: 932,117

[22] Filed: Aug. 9, 1978

[51] Int. Cl.² .......................... F16D 3/14; F16F 15/10
[52] U.S. Cl. ..................................... 192/106.1; 74/574
[58] Field of Search ........................ 192/106.1; 74/574

[56] References Cited

U.S. PATENT DOCUMENTS

| | | | |
|---|---|---|---|
| 1,642,475 | 9/1927 | Wood | 192/106.1 |
| 1,957,114 | 5/1934 | Spase | 192/106.1 X |
| 1,966,948 | 7/1934 | Forsythe | 192/106.1 X |
| 1,975,772 | 10/1934 | Davis | 192/106.1 |
| 2,068,963 | 1/1937 | Spase | 192/106.1 |
| 2,114,247 | 4/1938 | Davis | 192/106.1 |
| 2,597,380 | 5/1952 | Root | 192/106.1 X |
| 3,068,980 | 12/1962 | Smirl | 192/106.1 |

*Primary Examiner*—Nile C. Byers, Jr.
*Attorney, Agent, or Firm*—Donald F. Scherer

[57] ABSTRACT

A torsional vibration damper for use with a friction clutch incorporating torsional springs in a closed retainer housing. One end of each spring is driven by the retainer housing while the other end drives the output hub. The springs provide a resilient drive through a predetermined amount of relative angular movement between the retainer and the output hub after which movement the spring ends are in abutting relation so that a mechanical drive is present and overstressing of the springs is prevented. Preferably, the springs are used in pairs with each spring being less than a 360° arc.

3 Claims, 6 Drawing Figures

TORSIONAL VIBRATION DAMPER

This invention relates to torsional vibration dampers and more particularly to torsional vibration dampers incorporating torsion springs.

It is an object of this invention to provide an improved clutch and torsional vibration damper assembly having a pair of torsion type springs enclosed in a retainer housing wherein each end of each spring simultaneously contacts a drive tang on the housing and a driven tang on the output hub when no torque is being transmitted by the clutch and damper.

Another object of this invention is to provide an improved clutch and damper assembly wherein the clutch has input drive tangs axially spaced and radially aligned with output driven tangs which drive and driven tangs simultaneously contact the ends of torsion type springs when no torque is being transmitted by the clutch and damper and which drive and driven tangs move relative to each other from radial alignment when torque is transmitted through the clutch and damper.

A further object of this invention is to provide an improved clutch and damper assembly wherein the clutch input member has two pairs of drive tangs and the clutch output member has two pairs of driven tangs with each pair of drive tangs aligned with a respective pair of driven tangs and a torsion spring is operatively connected to each of the respective pairs of drive and driven tangs to maintain the tangs aligned when no torque is transmitted and to permit relative angular displacement between the drive and driven tangs when torque is transmitted and one end of each spring is urged into abutment with the other end of the spring when a predetermined amount of torque is transmitted to prevent further relative angular displacement.

These and other objects and advantages of the present invention will be more apparent from the following description and drawings in which.

Figure 1:
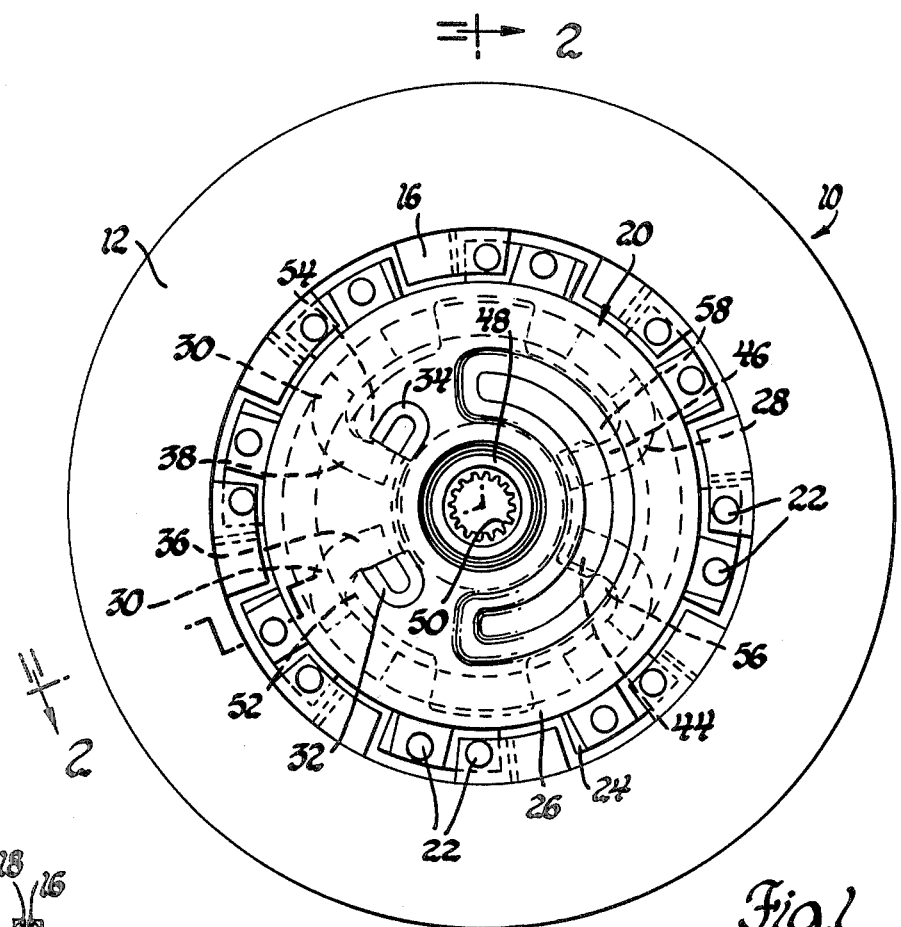
FIG. 1 is an elevational view of a clutch and damper assembly incorporating the present invention.
Figure 2:
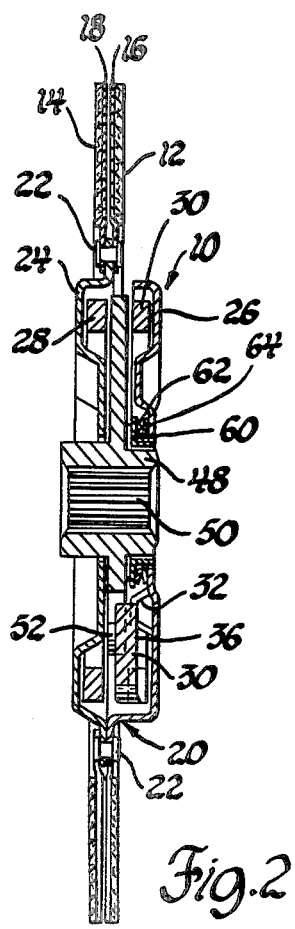
FIG. 2 is a sectional view taken along line 2—2 of FIG. 1.
Figure 3:
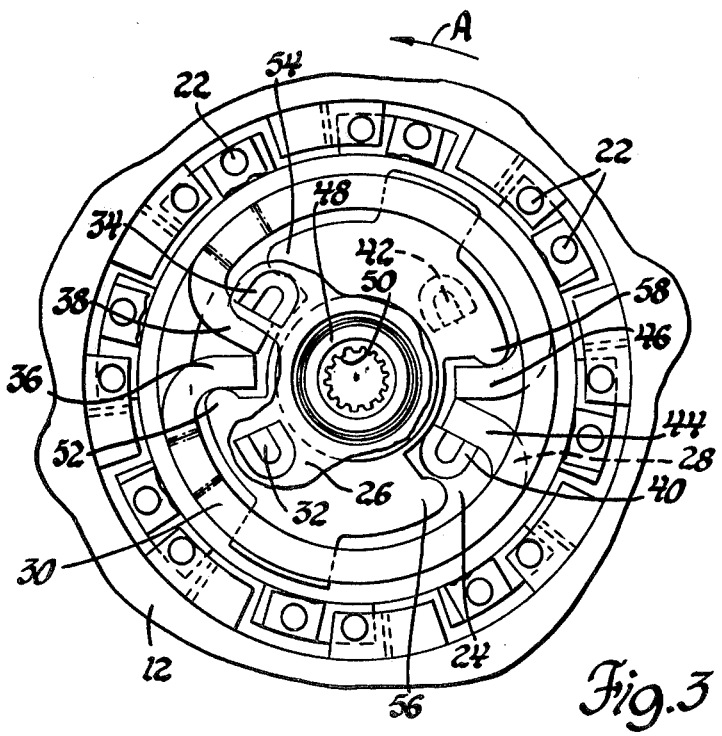
FIG. 3 is a view similar to FIG. 1 with the damper shown at full travel.

Referring to the drawings, wherein like characters represent the same or corresponding parts throughout the several views, there is seen in FIGS. 1 and 2, a clutch and torsional vibration damper assembly generally designated 10 having annular friction discs or clutch plates 12 and 14 bonded to steel backing plates 16 and 18, respectively, in a conventional manner. The steel plates 16 and 18 are secured to a retainer housing 20 by a plurality of rivets 22. The retainer housing 20 is comprised of a pair of sheet metal members 24 and 26 which substantially enclose a pair of torsion springs 28 and 30. The sheet metal member 26 has formed therein a pair of drive tangs 32 and 34 which, as seen in FIG. 1, abut the radially inward extending ends 36 and 38, respectively, of spring 30. The sheet metal member 24 has formed therein similar drive tangs 40 and 42, as best seen in FIG. 3, which tangs 40 and 42 are in abutting relationship, respectively, with radially inward extending ends 44 and 46 of spring 28 when the damper is in the at rest position shown in FIG. 1. The assembly 10 also includes an output hub 48 which has a spline 50 formed thereon such that a shaft may be operatively connected thereto. The hub 48 is mounted concentric to the retainer housing 20 and has formed thereon four driven tangs 52, 54, 56 and 58 which abut the ends 36, 38, 44 and 46, respectively, of springs 30 and 38, respectively.

An annular frictional surface 60 is drivingly connected to member 26 and urged against hub 48 by Belleville springs 62 and 64. In the at rest or nonworking condition shown in FIG. 1, the torsion spring 30 has a slight preload imposed thereon which forces the drive tangs 32 and 34 into radial alignment with the driven tangs 52 and 54. Likewise, the torsion spring 28 has a preload thereon which enforces radial alignment between the drive tangs 40 and 42 and the driven tangs 56 and 58.

The clutch and damper assembly is proposed for use with a so-called synchromesh or conventional transmission and is operable to isolate engine torsional vibrations from the transmission gearing structure. As is well-known with these types of devices, the engine torsional vibrations are accommodated by providing relative angular motion between the clutch input and output members. It is also desirable to limit the amount of relative angular travel between the clutch input and output members. One purpose for travel limitation is to prevent overstressing of the spring members used in the damper. The travel limitation in the present invention is limited by the abutment of spring ends 36 and 38 of spring 30 and spring ends 44 and 46 of spring 28. This can be seen in FIG. 3. In FIG. 3, it is assumed that the clutch is being driven in the direction of Arrow A such that incoming torque from the engine is transmitted through drive tangs 40 and 34 to spring ends 44 and 38, respectively. The torque is then transmitted through the springs 28 and 30 to driven tangs 58 and 52 via spring ends 46 and 36, respectively. As the springs 30 and 28 transmit torque, they will, of course, be deflected due to the spring characteristic such that their respective ends will approach each other until sufficient torque is transmitted to place the spring ends in abutting relationship thereby preventing further spring deflection. Thus, the springs 30 and 28 simultaneously provide two very important torsional vibration damper characteristics, that is, resilient drive and travel limitation.

Figure 4:
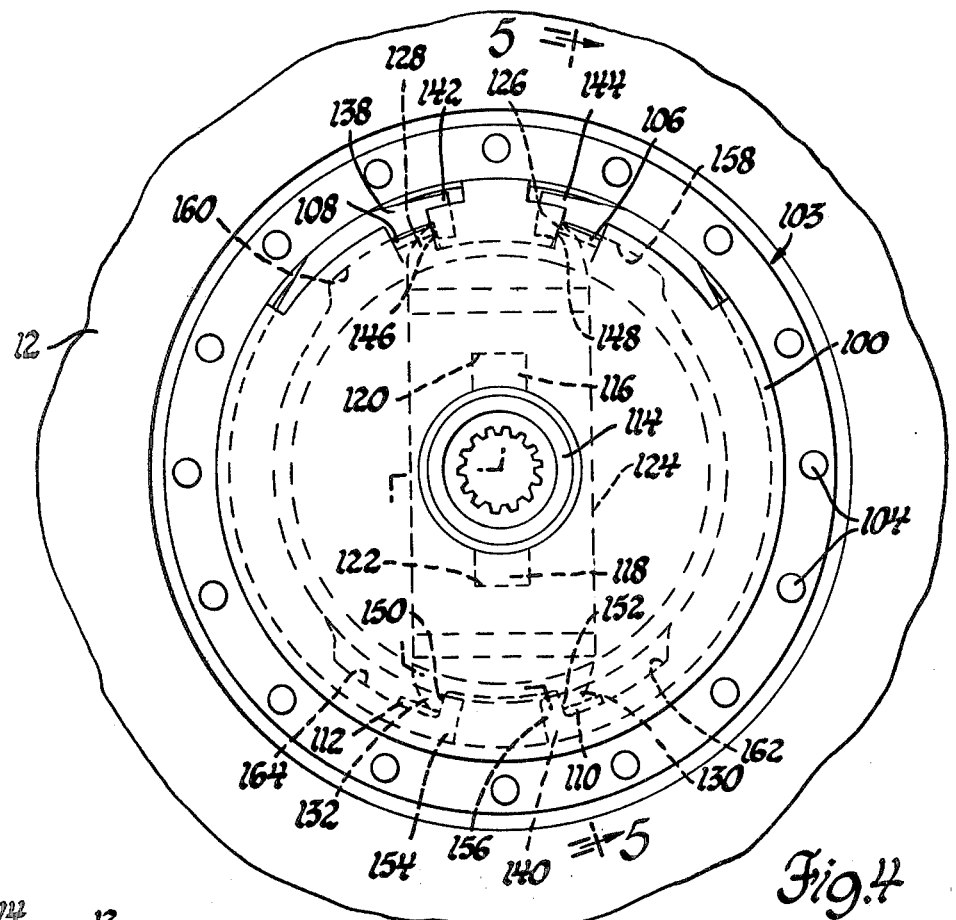
FIG. 4 is an elevational view of a damper incorporating another embodiment of the present invention.
Figures 5, 6:
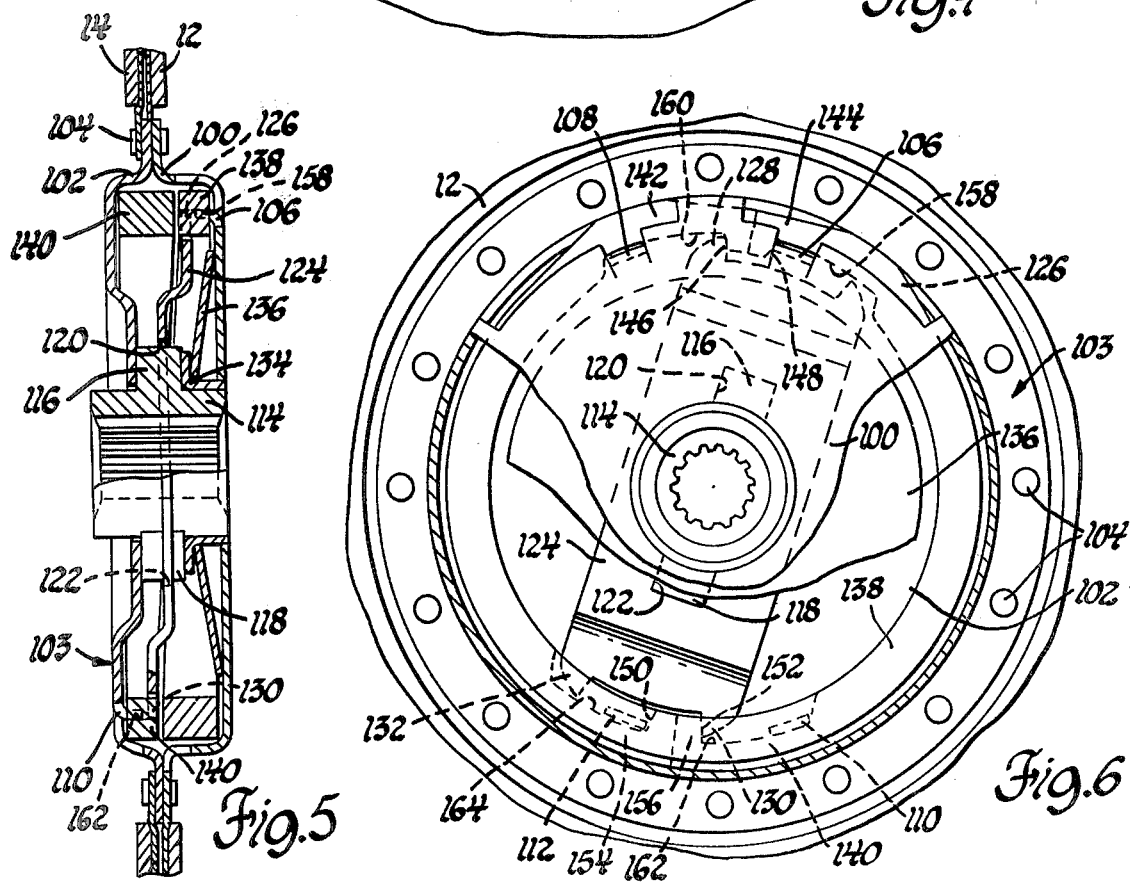
FIG. 5 is a sectional view taken along line 5—5 of FIG. 4.
FIG. 6 is a view similar to FIG. 4 with the damper shown at full travel.

The embodiment shown in FIGS. 4, 5 and 6 incorporates two sheet metal stampings 100 and 102 which are secured together, to form a retainer housing 103, by rivets 104 which also secure the stampings to the clutch plates 12 and 14. The stamping 100 has formed therein a pair of drive tangs 106 and 108 which are formed by displaced sheet metal. The stamping 102 has formed therein a pair of drive tangs 110 and 112, as best seen in FIG. 6, which are also formed by displaced sheet metal.

An output hub 114 is mounted concentric with the sheet metal members 100 and 102 and has formed thereon a pair of lugs 116 and 118 which are drivingly connected with slots 120 and 122 formed in a driven member 124. The driven member 124 has formed thereon four driven tangs 126, 128, 130 and 132.

A frictional damper member 134 is drivingly connected to sheet metal member 100 and rotatably supported on hub 114. The frictional member 134 is urged into frictional engagement with the drive lugs 116 and 118 by a Belleville spring 136. It will be appreciated by those familiar with vibration dampers that member 134 provides the frictional damping necessary for such devices.

A pair of torsion springs 138 and 140 are disposed in the retainer 103 formed by sheet metal members 100 and 102. The spring 138 has two ends 142 and 144 on which ends are formed radial surfaces 146 and 148, respectively. When the damper is in the at rest position shown in FIG. 4, the radial surfaces 146 and 148 abut drive tang 108, driven tang 128 and drive tang 106, driven tang 126, respectively. The spring 140 also has radial surfaces 150 and 152 formed on spring ends 154 and 156, respectively. These radial surfaces 150 and 152 contact drive tang 112, driven tang 132 and drive tang 110, driven tang 130, respectively, when the damper is in the at rest position. Spring 138 has formed therein a pair of annular recesses 158 and 160 which accommodate the relative movement between driven tangs 126 and 128 and drive tangs 106 and 108. The spring 140 has formed therein recesses 162 and 164 which accommodate the relative movement between the drive tangs 110 and 112 and driven tangs 130 and 132. The springs 138 and 140 each have rectangular cross sectional areas which increase continuously from each end to a maximum area diametrically opposite the opening between the ends. Each spring 138 and 140 also has a substantially flat radial surface on each end thereof, which surfaces come into abutting relationship, as seen in FIG. 6, and full damper travel has been achieved.

The damper shown in FIGS. 4 through 6, operates substantially in the same manner as described above for FIGS. 1 through 3; that is, torque is transmitted from the clutch plates 12 and 14 to the drive tangs which, in turn, transmit torque to the springs from which the torque is delivered to the driven tangs and hence the clutch output.

Those skilled in the art appreciate that the spring rate designed into the damper springs is determined by the torque range of the engine such that higher spring rates will be used for engines which generate higher torque output levels. It is also well-known that the frictional characteristic of the friction damping portion is adjustable to accommodate the desired damping rate.

The simplicity of manufacture of the damping structures described above, is self-evident from the drawings. However, it should be noted that the retainer housing in each of the damper structures is simple sheet metal with the tangs thereon formed integrally therewith during the sheet metal stamping process. The output hub 48 shown in FIGS. 1 through 3, is preferably a powdered metal component wherein the driven tangs are formed integrally with the hub during the powdered metal forming process. The output hub 114, shown in FIGS. 4 through 6, is also a powdered metal component and the driven member 124 is a sheet metal stamping. Thus, it is readily apparent that the manufactured assembly of the vibration damper is very economical.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torque transmitting clutch and damper assembly comprising; an annular friction disc; an annular retainer member having an outer diameter secured to said friction disc, an inner diameter, and a pair of axially offset radially extending circumferentially spaced drive tangs disposed between the inner and outer diameters; an output hub coaxial with said retainer having a pair of radially extending circumferentially spaced driven tangs each being parallel to and axially displaced from one or the other of said drive tangs respectively when said clutch and damper assembly is not transmitting torque; and preloaded torsion spring means having a pair of circumferentially spaced ends with each end having a surface extending radially inward and engageable with one or the other sets of said drive and driven tangs respectively to maintain a prededetermined circumferential space between said respective sets of drive and driven tangs when no torque is being transmitted by said clutch and damper assembly and for permitting relative angular movement between said retainer member and said output hub while transmitting torque therebetween, said spring ends being urged into abutting relation after a predetermined amount of relative angular movement occurs to prevent further relative angular movement between said retainer member and said output hub.

2. A torque transmitting clutch and damper assembly comprising; an annular friction disc; an annular retainer member having an outer diameter secured to said friction disc, an inner diameter, and a pair of axially offset radially extending circumferentially spaced drive tangs disposed between the inner and outer diameters; an output hub coaxial with said retainer having a pair of radially extending circumferentially spaced driven tangs each being parallel to and axially displaced from one or the other of said drive tangs respectively when said clutch and damper assembly is not transmitting torque; and preloaded torsion spring means having a pair of circumferentially spaced radially inward directed ends engageable with one or the other sets of said drive and driven tangs respectively to maintain a predetermined circumferential space between said respective sets of drive and driven tangs when no torque is being transmitted by said clutch and damper assembly and for permitting relative angular movement between said retainer member and said output hub while transmitting torque therebetween, said spring ends being urged into abutting relation after a predetermined amount of relative angular movement occurs to prevent further relative angular movement between said retainer member and said output hub.

3. A torque transmitting clutch and damper assembly comprising; an annular friction disc; an annular retainer member having an outer diameter secured to said friction disc, an inner diameter, and a pair of axially offset radially extending circumferentially spaced drive tangs disposed between the inner and outer diameters; an output hub coaxial with said retainer having a pair of radially extending circumferentially spaced driven tangs each being parallel to and axially displaced from one or the other of said drive tangs respectively when said clutch and damper assembly is not transmitting torque; and preloaded torsion spring means having a pair of circumferentially spaced ends with each end having a surface extending radially inward and engageable with one or the other sets of said drive and driven tangs respectively to maintain a predetermined circumferential space between said respective sets of drive and driven tangs when no torque is being transmitted by said clutch and damper assembly and for permitting relative angular movement between said retainer member and said output hub while transmitting torque therebetween and maintaining contact with one of the drive or driven tangs during torque transmission, and each spring means having an arcuate recess adjacent said radially inward extending surface to accommodate the drive or driven tang not in contact with the spring means during torque transmission, said spring ends being urged into abutting relation after a predetermined amount of relative angular movement occurs to prevent further relative angular movement between said retainer member and said output hub.

* * * * *